United States Patent [19]

Asada et al.

[11] Patent Number: 5,279,638
[45] Date of Patent: Jan. 18, 1994

[54] SLIDING MATERIAL

[75] Inventors: Eiji Asada; Hiromi Ogino, both of Aichi, Japan

[73] Assignee: Taiho Kogyo Co., Ltd., Aichi, Japan

[21] Appl. No.: 661,021

[22] Filed: Feb. 26, 1991

[30] Foreign Application Priority Data

Feb. 27, 1990 [JP] Japan ................. 2-44384

[51] Int. Cl.$^5$ .............................................. C22C 9/12
[52] U.S. Cl. ....................................... 75/235; 75/237; 75/240; 75/247
[58] Field of Search ................... 75/230–233, 75/235–237, 240, 247

[56] References Cited

U.S. PATENT DOCUMENTS

| | | | |
|---|---|---|---|
| 2,379,435 | 7/1945 | Hensel | 420/491 |
| 2,585,430 | 2/1952 | Boegehold | 427/191 |
| 2,887,765 | 5/1959 | Thomson et al. | 75/243 |
| 2,894,838 | 7/1958 | Hastings | 419/20 |
| 3,720,507 | 3/1973 | Laudin | 420/474 |
| 3,776,705 | 12/1973 | Niimi et al. | 29/182 |
| 3,790,351 | 2/1974 | Niimi et al. | 29/182 |
| 4,000,982 | 1/1977 | Ueda | 29/182.3 |
| 4,002,472 | 1/1977 | LeBrasse et al. | 75/208 R |
| 4,334,926 | 1/1982 | Futamura et al. | 75/230 |
| 4,505,987 | 3/1985 | Yamada et al. | 428/553 |
| 4,579,712 | 4/1986 | Mori | 419/9 |
| 4,588,441 | 5/1986 | Ikenoue et al. | 75/230 |
| 4,681,629 | 7/1987 | Reinshagen | 75/246 |
| 4,734,968 | 4/1988 | Kuroishi et al. | 29/156.7 |
| 4,904,537 | 2/1990 | Lytwnec | 428/548 |
| 4,935,056 | 6/1990 | Miyasaka | 75/231 |
| 4,941,919 | 7/1990 | Asada et al. | 75/235 |
| 5,125,962 | 6/1992 | Krentscher | 75/247 |

*Primary Examiner*—Donald P. Walsh
*Assistant Examiner*—Ngoclan T. Mai
*Attorney, Agent, or Firm*—Armstrong, Westerman, Hattori, McLeland & Naughton

[57] ABSTRACT

A Cu-Sn based sintered material, having an improved wear-resistance is obtained by adding from 0.1 to 30% of at least one hard matter(s) selected from the groups consisting of (a), (b), and (c) wherein (a), (b) and (c) are:

(a) $Fe_2P$, $Fe_3P$, FeB, $Fe_2B$, Mo, Co, Co-based self-fluxing alloy, and Ni-based self-fluxing alloy;

(b) SiC, TiC, WC, $B_4C$, TiN, cubic BN, $Si_3N_4$, $SiO_2$, $ZrO_2$, and $Al_2O_3$; and (c) Si-Mn, Cu-Si, and FeS.

4 Claims, 1 Drawing Sheet

SLIDING MATERIAL

BACKGROUND OF INVENTION

1. Filed of Invention

The present invention relates to a Cu-Sn based sintered, sliding material. More particularly, the sliding material according to the present invention is used in a sliding bearing where corrosion-resistance against the lubricating oil or wear-resistance is required. When the opposed shaft of the sliding bearing has a rough surface and/or is made of material, such as cast iron, a part of the material, particularly graphite, is easily removed during sliding to form a rough surface. The sliding material is worn out by the rough surface, which may be formed either by machining or partial removal of the material during sliding.

2. Description of Related Arts

Bronze and lead bronze, which are used in a large amount for a bush, are sliding materials which exhibit excellent wear- and load-resistance. However, along with a recent change in the conditions under which sliding bearings are used particularly, increase in the surface pressure and rise in the temperature of lubricating oil, bearing troubles due to wear frequently occur. Hard matters are therefore added to the sintered leadbronze which is sintered on a steel sheet, so as to enhance the wear-resistance such that it can meet to the recent change in the conditions under which the sliding material is used.

The sliding material proposed in Japanese Examined Patent Publication No. 57-50,844 filed by the present assignee is characterized in that its composition is from 10 to 40% of Pb, from 1 to 30% of hard matter, the balance being Cu; or from 10 to 40% of Pb, from 1 to 30% of hard matter, from 0.1 to 10% of Sn and/or from 0.1 to 5% of Sb, the balance being Cu. The hard matter used is Mo, Co, $Fe_3P$, FeB, $Fe_2B$, or a Ni or Co-based self-fluxing alloy having a particular composition. Since the Pb content of this sliding material is from 10 to 40% the compatibility is improved. However, the effect of the hard matter is not thoroughly exhibited because a portion of the hard matter included in the Pb matrix is removed from the matrix during sliding. In addition, since the Pb content is from 10 to 40%, preferential corrosion of Pb is likely to occur when the temperature of the lubricating oil is from 120° to 130° C. Such corrosion occurred when the above-mentioned sliding material was used in an automatic transmission.

SUMMARY OF INVENTION

It is an object of the present invention to provide a sintered sliding material consisting of bronze or lead bronze with a hard additive, which exhibits improved wear-resistance when used as a sliding material in a condition where it is likely to wear due to the rough surface of the opposed material.

It is another object of the present invention to provide a sintered sliding material consisting of bronze or lead bronze with a hard additive, which exhibits improved property when used as a sliding material in a condition where it is likely to corrode due to the lubricating oil.

It is a further object of the present invention to provide a bronze or lead bronze with a hard additive, which exhibits improved wear-resistance and corrosion-resistance when used as a sliding material in a condition where it is likely to wear out due to the rough surface of the opposed material and to simultaneously corrode due to the lubricating oil.

In accordance with the objects of the present invention, there is provided the following sliding materials.

A. A sintered material containing from 0.1 to 15% of Sn, and from 0.1 to 30% of at least one hard matter which is selected from at least one of the groups (a), (b), (c) and (d), given below, the balance being essentially Cu.

B. A sintered material containing from 0.1 to 15% of Sn, from 1 to less than 10% of Pb, from 0.1 to 30% of at least one hard matter which is selected from at least one of the groups (a), (b), (c) and (d), given below, the balance being essentially Cu.

(a) $Fe_2P$, $Fe_3P$, FeB, $Fe_2B$, Mo, Co, Co-based self-fluxing alloy, and Ni based self-fluxing alloy.

(b) Fe-Cr, Fe-Mn, Fe-Ni, Fe-Si, Fe-W, Fe-Mo, Fe-V, Fe-Ti, Fe-Nb, CuP, Cr, and W (c) SiC, TiC, WC, $B_4C$, TiN, cubic BN, $Si_3N_4$, $SiO_2$, $ZrO_2$, and $Al_2O_3$.

(d) Si-Mn, Cu-Si, and FeS

The present invention is hereinafter described in detail.

The sliding material A is a binary Cu-Sn alloy free of Pb. Pb is not contained so as to prevent its preferential corrosion. Heretofore, Pb was added in the Cu-based bearing alloy so as to enhance compatibility and the lubricating property. When the conventional bearing alloy is used in a condition where the corrosion due to the lubricating oil is likely to occur, corrosion of Pb first occurs and then the hard matter and metal phases are removed from the material during sliding. The strength of the bearing decreases drastically and the life of the bearing thus expires. Contrary to this, the sliding material A according to the present invention exhibits improved corrosion-resistance because of the absence of Pb. The hard matter is added to this alloy so as to enhance the wear-resistance. The wear-resistance of the sliding material A is considerably improved due to the addition of hard matter and the absence of Pb. Sn added to the sliding material A in an amount of 0.1% or more improves the mechanical strength and corrosionresistance. When the Sn content exceeds 15%, Cu-Sn intermetallic compounds, which are very brittle, are precipitated in the Cu matrix, thereby impairing the resistance of the Cu matrix against load and impact. The preferred Sn content is from 3 to 10%.

One or more kinds of hard matter, such as $Fe_3P$, Mo, Co, FeB, $Fe_2B$ and the like, are added to the bronze powder or metallic Cu powder and/or Sn powder in an amount of from 0.1 to 30%. The hard matter and the bronze powder or Cu and Sn powder are mixed and sintered. The hard matter then disperses around or in the Cu-rich particles of the sintered material. When the sliding material A is brought into sliding contact with the opposed material, the hard matter is brought into contact with the opposed material and prevents the wear of the sliding material.

The hard matters belonging to group (a) are phosphides and a self-fluxing alloy which has properties equivalent to the phosphides. These hard matters damage very slightly the opposed material.

The hard matters belonging to group (b) are ferro-alloys as well as compounds and non-ferrous metals which have properties equivalent to the ferro-alloys.

The hard matters belonging to group (c) are carbides, nitrides and oxides.

The hard matters belonging to group (d) are Si-Mn, high Si-Cu alloy, and sulfides which do not belong to the above three groups.

When the content of the hard matter(s) is less than 0.1%, it is not effective for enhancing the wear-resistance. On the other hand, when the content of the hard matter(s) is more than 30%, a disadvantage of the hard matter(s), that is, damage to the opposed material and impairment of sintering property, becomes appreciable. The preferred content of the hard matter(s) is from 0.3 to 10%, and the optimal content is from 0.5 to 7%.

In the sliding material B, from 0.1 to less than 10% of Pb is added so as to improve compatibility and the lubricating property over the sliding material A. The corrosion-resistance is, however, slightly sacrificed in the sliding material B. When the Pb content is less than 0.1%, the compatibility is not improved. On the other hand, when the Pb content is 10% or more, the corrosion-resistance is seriously impaired. The preferred Pb content is from 3 to 9%.

The above described sliding materials are produced by mixing a metallic powder, such as Cu, Sn and Pb powder, and an alloy powder (grain size under 177 μm) with the powder of the hard matter (grain size under 100 μm) by means of a V blender, dispersing the powder mixture on a steel sheet backing, and sintering the powder mixture together with the steel sheet backing at a temperature of from 650° to 900° C.

DESCRIPTION OF PREFERRED EMBODIMENTS

Figure 1:
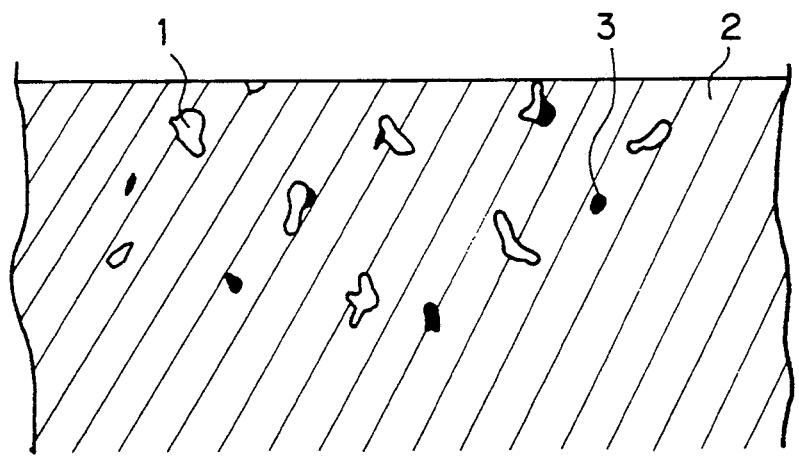
FIG. 1 is a schematic drawing showing the metal microstructure of the sliding material B.

The FIG. 1 denotes particles. The Cu-alloy particles 2, are shown in the drawing as the aggregates. Most of the hard particles, 3, i.e., the particles of hard matter(s), disperse in the Cu particles 2, or in the grain boundaries between the Cu particles 2 as well as between the Pb and Cu particles 1. A part of the hard particles 3, disperse in the Pb particles 1.

Since the hard particles 3, are harder than the ordinarily used opposed material, they 3, are wear-resistant to the opposed materials. This contributes to maintaining the sliding characteristics of the sliding material when the roughness of the opposed material is great, such as in a case where the opposed material is a nodular graphite cast iron (also referred to as the ductile cast iron) or grey cast iron. The hardness of the as-cast nodular graphite cast iron is approximately Hv 200. The hardness of the heat-treated nodular graphite cast iron is approximately Hv 400. The hard materials have higher hardness values than that of the nodular graphite cast irons. The flaky or nodular graphite is removed from the sliding surface of the above cast irons during sliding with any kind of sliding materials, thereby forming protrusions on the sliding surface of the cast irons. The protrusions seriously damage and roughen the surface of a sliding material if it does not include the hard particles 3. The hard particles 3 are resistant against the roughening of the surface, wear, and seizure load.

Now, the corrosion-resistance is described. When the sliding material is exposed to lubricating oil, the Pb particles 1 are corroded on the surface of the sliding material. As corrosion further proceeds, the corrosion of Pb particles occurs not only on the surface but also in the interior of the sliding material. The Pb particles 1, therefore, dissolve away from the sliding material. In such a situation, the strength of the sliding material is greatly lessened due to decrease in the density thereof. In addition, the lubricating property of the sliding material is lost. Furthermore, the hard particles 3, cannot be resistant against damage by the rough surface of the opposed material. This is related to the low strength of the sliding material. Specifically, since the aggregates of Cu particles 2 greatly deform under the load of the opposed material, the hard particles 3 are displaced away from the opposed material. As a result, the life of the sliding material is lost. The corrosion due to lubricating oil is more likely to be chemical than electrochemical, that is, corrosion due to the difference in the potential between the noble Cu and the less noble Pb. The corrosive media seem to be (1) inorganic acid formed by the combustion gas of the engine oil which intrudes into the lubricating oil, (2) organic acid contained in the lubricating oil, and (3) an additive(s) to e lubricating oil. Using objective and the conditions of use of an appliance decide which kind of the corrosive media causes the corrosion of Pb particles. For example, in the case of a sliding bearing used in an automatic transmission, (2) is the most probable corrosive medium. In the case of an engine operated in severe condition, (1) is the most probable corrosive medium.

The present inventors tried to enhance the corrosion-resistance of the Pb particles 1 by means of alloying them. However, all of the alloying elements tested were alloyed with the Cu particles 2. The present inventors therefore conceived an alternative to the alloying method: that is, the amount of the Pb particles 1 is decreased by means of decreasing the Pb content, or no Pb is included. The life of a sliding bearing could thus be prolonged when used in a corrosive condition.

The sliding materials according to the present invention can be used for a bush which is in a sliding contact with the rotary shaft of an oil pump. Since the sliding condition of such a bush is the fluid lubricating, the main reason for shortening the life of a bush is corrosion.

The sliding materials according to the present invention can be used for a bush which is in a slidable contact with a sun gear. In this case, the main reason for shortening the life of a bush is wear.

The present invention is hereinafter described by way of an example.

EXAMPLE

Lead bronze having a compostion of Cu - 0.1~25% Pb - 0.1 15% Sn, and bronze having a composition of Cu - 0.1~15% Sn were pulverized by an atomizing method. The said powder, under 177 um grain size, was used as the starting material. Hard matters were prepared in the form of a powder under 63 μm grain size. The powder of bronze and lead bronze was mixed by a V blender to provide the compositions given in Table 1. The powder mixture was sprayed to a thickness of 1.35 mm on a steel sheet which was preliminarily degreased and sanded. The sintering was then carried out at a temperature of from 700° to 850° C. for 15 to 60 minutes in $H_2$ atmosphere. After rolling, the second sintering was carried out under identical conditions. Bimetal materials were therefore obtained and were cut to a predetermined size to provide test pieces for the wear test, seizure test, and corrosion test under the following conditions. In the seizure test, the surfce of the S55C shat was made so rough that the surface of the test samples was roughened during sliding.

1. Wear Test
    Tester: a cylindrical flat plate-type friction and wear tester
    Sliding speed: 0.42 m/sec
    Load: 20 kgf
    Kind of lubricating oil: automatic transmission fluid
    Temperature of lubricating oil: 100° C.
    Opposed shaft: S55C (quenched)
    Roughness of shaft: 0.8 μm Rz
    Test time: 60 minutes
2. Seizure test
    Tester: a thrust tester
    Rotation: 1000 rpm
    Load: increase by a rate of 20 kgf/10 min
    Kind of lubricating oil: automatic transmission fluid
    Lubricating method: dipping method
    Temperature of lubricating oil: 100° C.
    Opposed shaft: S55C (quenched)
    Roughness of shaft: 3 μm Rz
    Measured unit of seizure load: 10 kgf

TABLE 1

| Samples | | Cu | Sn | Pg | Fe$_2$P | Fe$_3$P | CuP | FeB | Fe$_2$B | Mo | Co | Ni-based self-fluxing alloy | Co-based self-fluxing alloy | Corrosion loss | Volume wear | Seizure load |
|---|---|---|---|---|---|---|---|---|---|---|---|---|---|---|---|---|
| Inventive Materials (I) | 1 | Bal | 0.1 | — | 5.0 | — | — | — | — | — | — | — | — | 6.0 | 0.19 | 110 |
| | 2 | " | 2.6 | — | — | — | — | — | 3.2 | — | — | — | — | 3.0 | 0.24 | 120 |
| | 3 | " | 4.2 | — | — | 8.5 | — | — | — | — | — | — | — | 2.0 | 0.29 | 120 |
| | 4 | " | 6.3 | — | 2.0 | — | — | — | 2.0 | — | 2.0 | — | — | 2.0 | 0.14 | 120 |
| | 5 | " | 8.1 | — | — | 10.0 | — | 0.5 | — | — | — | — | — | 1.0 | 0.06 | 100 |
| | 6 | " | 10.0 | — | 0.5 | 0.5 | 0.5 | — | 0.5 | 0.5 | 0.5 | 0.5 | 0.5 | 1.0 | 0.09 | 140 |
| | 7 | " | 10.0 | — | — | 5.0 | — | — | — | — | — | — | — | 1.0 | 0.08 | 140 |
| | 8 | " | 10.0 | — | — | — | — | 1.0 | — | 1.0 | — | — | 1.0 | 1.0 | 0.20 | 120 |
| | 9 | " | 12.5 | — | — | 1.0 | — | — | — | — | — | — | — | 1.0 | 0.31 | 110 |
| | 10 | " | 15.0 | — | — | 2.5 | 2.5 | — | — | — | — | — | — | 1.0 | 0.11 | 120 |
| Inventive Materials (II) | 11 | Bal | 0.5 | 2.0 | — | — | — | — | — | 5.0 | — | — | — | 8.0 | 0.26 | 120 |
| | 12 | " | 1.5 | 7.4 | 1.0 | — | — | — | 1.0 | — | — | — | 1.0 | 6.0 | 0.21 | 130 |
| | 13 | " | 4.6 | 3.5 | — | 0.1 | — | — | — | — | — | — | — | 3.0 | 0.30 | 110 |
| | 14 | " | 7.1 | 6.5 | — | 1.0 | — | — | — | 1.0 | 1.0 | — | — | 4.0 | 0.24 | 140 |
| | 15 | " | 8.4 | 0.1 | — | 3.0 | 3.0 | — | — | — | — | — | — | 2.0 | 0.16 | 120 |
| | 16 | " | 10.0 | 5.0 | — | — | — | 2.5 | — | — | 2.5 | — | — | 3.0 | 0.13 | 170 |
| | 17 | " | 10.0 | 5.0 | 0.5 | 0.5 | 0.5 | 0.5 | 0.5 | 0.5 | 0.5 | 0.5 | 0.5 | 3.0 | 0.12 | 150 |
| | 18 | " | 10.0 | 9.9 | — | 5.0 | — | — | — | — | — | — | — | 5.0 | 0.13 | 210 |
| | 19 | " | 13.4 | 1.0 | — | — | 3.0 | — | — | — | — | — | — | 1.0 | 0.33 | 120 |
| | 20 | " | 15.0 | 5.0 | — | 10.0 | — | — | — | — | — | — | — | 2.0 | 0.09 | 150 |
| Comparative Materials | 21 | Bal | — | 25.0 | — | — | — | — | — | — | — | — | — | 42.0 | 0.97 | 20 |
| | 22 | " | — | 25.0 | — | 5.0 | — | — | — | — | — | — | — | 39.0 | 0.45 | 80 |
| | 23 | " | 5.0 | 10.0 | — | — | — | — | — | — | — | — | — | 10.0 | 0.58 | 50 |
| | 24 | " | 5.0 | 25.0 | — | — | — | — | — | — | — | — | — | 22.0 | 0.78 | 30 |
| | 25 | " | 5.0 | 25.0 | — | 5.0 | — | — | — | — | — | — | — | 20.0 | 0.39 | 90 |

TABLE 2

| Examples | | Cu | Sn | Pb | Hard matter | Volume wear (mm$^3$) | Seizure load (Kg) |
|---|---|---|---|---|---|---|---|
| Inventive Materials (II) | 26 | Bal | 10.0 | 5.0 | 5.0 (Fe$_2$P) | 0.13 | 200 |
| | 27 | " | 10.0 | 5.0 | 5.0 (Fe$_3$P) | 0.12 | 210 |
| | 28 | " | 10.0 | 5.0 | 5.0 (CuP) | 0.31 | 130 |
| | 29 | " | 10.0 | 5.0 | 5.0 (FeB) | 0.21 | 150 |
| | 30 | " | 10.0 | 5.0 | 5.0 (Fe$_2$B) | 0.23 | 140 |
| | 31 | " | 10.0 | 5.0 | 5.0 (Mo) | 0.20 | 140 |
| | 32 | " | 10.0 | 5.0 | 5.0 (Co) | 0.20 | 140 |
| | 33 | " | 10.0 | 5.0 | 5.0 (Ni-based self-fluxing alloy) | 0.18 | 150 |
| | 34 | " | 10.0 | 5.0 | 5.0 (Co-based self-fluxing alloy) | 0.18 | 160 |
| | 35 | " | 10.0 | 5.0 | 5.0 (Fe—Cr) | 0.16 | 190 |
| | 36 | " | 10.0 | 5.0 | 5.0 (Fe—Mn) | 0.17 | 200 |
| | 37 | " | 10.0 | 5.0 | 5.0 (Fe—Si) | 0.16 | 190 |
| | 38 | " | 10.0 | 5.0 | 5.0 (Cr) | 0.21 | 150 |
| | 39 | " | 10.0 | 5.0 | 5.0 (W) | 0.22 | 140 |
| | 40 | " | 10.0 | 5.0 | 5.0 (SiC) | 0.20 | 170 |
| | 41 | " | 10.0 | 5.0 | 5.0 (Tic) | 0.20 | 150 |
| | 42 | " | 10.0 | 5.0 | 5.0 (WC) | 0.21 | 160 |
| | 43 | " | 10.0 | 5.0 | 5.0 (B$_4$C) | 0.22 | 180 |
| | 44 | " | 10.0 | 5.0 | 5.0 (TiN) | 0.22 | 150 |
| | 45 | " | 10.0 | 5.0 | 5.0 (BN) | 0.23 | 160 |
| | 46 | " | 10.0 | 5.0 | 5.0 (Si$_2$N$_4$) | 0.23 | 150 |
| | 47 | " | 10.0 | 5.0 | 5.0 (SiO$_2$) | 0.23 | 130 |
| | 48 | " | 10.0 | 5.0 | 5.0 (ZrO$_2$) | 0.24 | 130 |
| | 49 | " | 10.0 | 5.0 | 5.0 (Al$_2$O$_3$) | 0.19 | 140 |
| | 50 | " | 10.0 | 5.0 | 5.0 (Si—Mn) | 0.26 | 160 |
| | 51 | " | 10.0 | 5.0 | 5.0 (Fe—W) | 0.23 | 160 |
| | 52 | " | 10.0 | 5.0 | 5.0 (Fe—Mo) | 0.22 | 180 |
| | 53 | " | 10.0 | 5.0 | 5.0 (Fe—V) | 0.23 | 190 |
| | 54 | " | 10.0 | 5.0 | 5.0 (Fe—Ti) | 0.21 | 190 |
| | 55 | " | 10.0 | 5.0 | 5.0 (Fe—Nb) | 0.21 | 200 |
| | 56 | " | 10.0 | 5.0 | 5.0 (Cu—Si) | 0.26 | 130 |
| | 57 | " | 10.0 | 5.0 | 5.0 (Fe—Ni) | 0.27 | 130 |

3. Corrosion test
    Tester: static corrosion tester
    Kind of lubricating oil: automatic transmission fluid
    Lubricating method: dipping method
    Temperature of lubricating oil: 170 ± 5° C.
    Test time: 200 hours The results are given in Tables 1 and 2.

As is apparent from Table 1, the corrosion-resistance, wear-resistance, and seizure resistance of the sliding materials according to the present invention are superior to those of the comparative sliding materials.

In Table 2, the Pb content is set constant at 5%, while varying the kinds of hard matters. Although the seizure load varies twice in the maximum and minimum values depending upon the kind of hard matters, the seizure load is superior to that of the conventional materials.

We claim:

1. A sintered sliding material, which consists of from 0.1 to 15% of Sn, and from 0.1 to 30% of at least one hard matter which is selected from at least one of the groups (a), (b) and (c), given below, the balance being essentially Cu:

(a) $Fe_2P$, $Fe_3P$, FeB, $Fe_2B$, Mo, Co, Co-based self-fluxing alloy, and Ni-based self-fluxing alloy;

(b) SiC, TiC, WC, $B_4C$, TiN, cubic BN, $Si_3N_4$, $SiO_2$, $ZrO_2$, and $Al_2O_3$; and (c) Si-Mn, Cu-Si, and FeS.

2. A sintered sliding material according to claim 1, wherein the content of the hard matter is from 0.3 to 10%.

3. A sintered sliding material according to claim 2, wherein the content of the hard matter is from 0.5 to 7%.

4. A sintered sliding material according to claim 1, where the hard matter is selected from (a) $Fe_2P$, $Fe_3P$, FeB, $Fe_2B$, Mo, Co, Co-based self-fluxing alloy, and Ni-based self-fluxing alloy.

* * * * *